United States Patent
Hajek et al.

(10) Patent No.: US 6,664,314 B1
(45) Date of Patent: Dec. 16, 2003

(54) MOULDING COMPOSITIONS FOR THE PRODUCTION OF SANITARY-WARE COMPONENTS HAVING MORE THAN ONE VISIBLE SIDE

(75) Inventors: Andreas Hajek, Brackenheim (DE); Thomas Wilhelm, Sulzfeld (DE); Stefan Harke, Sinsheim-Rohrbach (DE)

(73) Assignee: Blanco GmbH & Co KG, Oberderdingen (DE)

( * ) Notice: Subject to any disclaimer, the term of this patent is extended or adjusted under 35 U.S.C. 154(b) by 84 days.

(21) Appl. No.: 09/664,262

(22) Filed: Sep. 18, 2000

Related U.S. Application Data

(63) Continuation of application No. PCT/EP99/01122, filed on Feb. 20, 1999.

(30) Foreign Application Priority Data

Mar. 19, 1998 (DE) .......................... 198 12 123

(51) Int. Cl.$^7$ ................................. C08K 3/00
(52) U.S. Cl. ...................... 523/218; 523/219
(58) Field of Search ................ 523/201, 218, 523/219

(56) References Cited

U.S. PATENT DOCUMENTS

| | | | | |
|---|---|---|---|---|
| 3,855,160 A | * | 12/1974 | Shiotsu | ........................ 260/2.5 |
| 4,419,459 A | | 12/1983 | Melchior | |
| 4,811,402 A | * | 3/1989 | Ward | .......................... 381/68.6 |
| 5,223,586 A | | 6/1993 | Mautner et al. | |
| 5,690,872 A | | 11/1997 | Krieg et al. | |

FOREIGN PATENT DOCUMENTS

EP  559 254  9/1993

* cited by examiner

Primary Examiner—Edward J. Cain

(57) ABSTRACT

In order to provide a moulding composition which makes it possible to form shaped components having not only one but two or more visible sides, it is proposed that this composition comprise a methyl-methacrylate-based syrup and up to 85%, expressed in terms of the moulding composition, of an inorganic filler, and that the moulding composition comprise deformable, propellant-filled hollow microspheres having a plastic wall which is essentially insoluble in methyl methacrylate, the proportion by volume of the hollow microspheres to the total volume of the moulding composition being in the 5 to 50 vol. % range.

21 Claims, No Drawings

MOULDING COMPOSITIONS FOR THE PRODUCTION OF SANITARY-WARE COMPONENTS HAVING MORE THAN ONE VISIBLE SIDE

This application is a continuation of application Ser. No. PCT/EP99/01122 filed Feb. 20, 1999.

The invention relates to a moulding composition for the production of sanitary-ware components having more than one visible side, and to sanitary-ware components which are produced from these moulding compositions.

Typical moulding compositions for the production of sanitary-ware components, including kitchen sinks and the like, are moulding compositions which comprise a methylmethacrylate-based syrup and an inorganic filler, as described for example in German Patent DE-24 49 656, European Patent Application EP 0 361 101 and also WO 95/23825.

These moulding compositions are very suitable for the production of shaped components on which there is only one so-called visible side, and on which the opposite side of the shaped component from the visible side can no longer be seen after the shaped component has been installed. The appearance of the opposite side of the shaped component from the visible side is therefore unimportant to the saleability of the product, and need not therefore, in particular, follow defined contours or have a smooth surface.

Shaped components, in particular, which have been produced from acrylate moulding compositions, shrink very significantly on reacting. The dispersions used to produce the shaped components often contain about 30 to 40 wt. % of methyl methacrylate monomer, which shrinks by about 24 vol. % on polymerization. Calculated in terms of the methylmethacrylate-based dispersions, this leads to about 10 vol. % shrinkage of the dispersions or moulding compositions. Since this shrinkage needs to be compensated for at least to a large extent, in order to obtain marketable products, it is necessary to take the shrinkage effect into account using an elaborate tool design with "floating" tool halves, which are pressed together by pneumatic or hydraulic pressure (cf. e.g. EP 0 019 867 A1).

At the same time, elaborate temperature programmes are required during the polymerization process. For example, the visible or good side of the shaped component first needs to be heated, while the reverse side still needs to be kept cool initially, to ensure that the polymerization does not set in there until later. Only after about 10 min can the polymerization temperature of about 100° C. be applied there as well.

Although a visually attractive used side or visible side of the shaped component can be obtained by these elaborate measures, especially by the differential temperature application, it is nevertheless only possible to produce shaped components which have just one such visible or good side. In the case of kitchen sinks, for example, it has been possible to use these methods and shaped components only because the sink has hitherto been installed in the supporting kitchen cupboard in such a way that the reverse side is concealed by the furniture parts.

As for moulding composition formulations, as disclosed for example by EP 0 361 101 A1, which uses very coarse-grained fillers, the shrinkage compensated for by the moulding tool, despite special tool designs, leads to very rough surfaces, since, between the coarse filler grains which remain at the surface, the polymer matrix detaches to a considerable degree from the tool surface and forms microscopic indentations in the visible-side surface. This increased roughness leads to the accumulation of dirt particles during use. At the same time, it is more difficult to remove dirt particles again from the surface once they have adhered. Because of the roughness, which is naturally likewise relatively great, on the reverse sides, it is difficult to carry out cleaning here as well. Owing to the large number of indentations, dust particles are retained by the reverse side, opposite the visible side, and cause increased susceptibility to soiling.

The object of the present invention is to provide a moulding composition which makes it possible to form shaped components having not only one but two or more visible sides.

This object is achieved according to the invention in that the moulding composition, which comprises a methylmethacrylate-based syrup and up to 85 wt. % of an inorganic filler, furthermore comprises compressible propellant-filled hollow microspheres having a plastic wall which is essentially insoluble in MMA, the proportion by volume of the hollow microspheres to the total volume of the moulding composition being in the 5 to 50 vol. % range With the moulding composition according to the invention, it is possible to produce shaped components in which the surface roughness of the reverse side corresponds approximately to that of the visible side. The moulding compositions hence open up further possible applications in addition to the shaped components hitherto produced therefrom.

Shaped components (e.g. kitchen sinks) produced conventionally from moulding compositions can be used in a novel way, i.e. the kitchen sinks may for example be installed in a work surface in such a way that their reverse side may also remain visible.

A further advantage is that the visible side is easy to clean, even in cases in which relatively coarse-grained fillers have been used. This is true even in the case of shaped components made from materials whose coarse-grained filler is in the range of from about 100 $\mu$m to more than 1000 or even 3000 $\mu$m.

While, in the case of conventional formulations, the filler content brought about a reduction in the shrinkage effect in addition to improving the functional properties, the filler content was also important in terms of reducing the volume of monomer, since naturally the shrinkage effect was commensurately less when the proportion of syrup in the moulding composition was lower. It was possible to achieve a further reduction of the shrinkage effect by using MMA prepolymers (so-called polymethyl methacrylate, abbreviated to PMMA), which was likewise capable of bringing about a decrease of the shrinkage effect. PMMA can nevertheless only be used to a certain degree since it significantly increases the viscosity of the syrup.

According to the present invention, however, the proportion of filler can be tailored just to the desired obtaining of the functional properties of the shaped component, and need no longer take the shrinkage effect into account.

Consequently, moulding compositions having a filler content of less than 20 wt. % are also readily possible.

The preferred proportion by volume of the hollow microspheres is in the range of from 8 to 45 vol. % of the moulding composition.

The particle size of the hollow microspheres is not subject to any particular restrictions, although the particle size should be smaller that 500 $\mu$m, so as to ensure that, in cases in which the hollow microspheres come to lie at the surface, when there is stress on the surface these cannot be damaged and then lead to indentations in the surface of the shaped component.

It has already been mentioned that PMMA can be used as a modifying agent for the syrup, especially with a view to reducing the shrinkage effect, but also with a view to moderating moulding-composition viscosities.

For the latter reason, the addition of PMMA to the syrup may also be indicated according to the invention, in which case PMMA having a molecular weight ($M_w$) of 50,000 to 250,000 is employed here, as in the prior art, and may be present in the syrup in an amount of up to 20 wt. %, expressed in terms of the mass of the syrup.

The hollow microspheres are preferably thermoplastic hollow spheres having elastic properties, which are produced by an expansion process.

For example, the hollow microspheres disclosed by EP 0 559 254 A1 have proved suitable, although these can only be used in the expanded state. Experiments with non-expanded hollow microspheres of this type show that the production of shaped components having more than one visible layer is not then possible.

Although non-expanded hollow spheres have already been described in connection with compensating for shrinkage effects, it has unexpectedly been found, as mentioned above, that only already expanded hollow microspheres show the desired effect in the MMA dispersion in the present applied use, even though the curing conditions for the moulding composition correspond approximately to the conditions for the expansion of the hollow spheres. Expanded hollow microspheres have to date been recommended only as light filler.

These hollow microspheres must be incorporated in the dispersion in a suitable way. This can be done, for example, by putting a finished dispersion/moulding composition in a pressure vessel and carefully adding the hollow microspheres to it portion-wise while stirring intimately. It is important in connection with this for the pressure vessel to be suitably pressurised, suitable pressures being between 1 and 5 bar. If the pressure is too low, the mould cannot be filled, and if the pressure is too high the spheres will obviously be broken, so that the desired effect is no longer observable.

During the preparation of the moulding composition according to the invention, it is important for the vessel pressure to be maintained for some time after the tool has been filled in order to produce the shaped component, so that more composition can be squeezed into the mould through a process of compressing the hollow microspheres. When the temperature programme is carried out, the moulding composition will then become heated and hence so will the propellant present in the hollow microspheres, so that the hollow microspheres will undergo re-expansion so as to compensate for the shrinkage.

As already mentioned, the addition of hollow microspheres can be used for many moulding-composition formulations, both as regards formulating the plastic matrix (syrup) and as regards the fillers used in the moulding composition. Because of the shrinkage-compensating effect, it is even possible to produce shaped components from high-shrinkage acrylate syrups which do entirely without fillers. It is hence e.g. conceivable to produce hand washbasins or toilet bowls, which have hitherto been available essentially only in ceramic because of the visibility of the reverse side of the shaped component.

A preferred size for the hollow microspheres is in the 50 to 80 $\mu$m range, although particles in the 5 to 100 $\mu$m range may also readily be used.

In the preferred hollow microspheres, the wall of the spheres consists of a copolymer of PMMA, PAN and PMAN, although this does not represent any absolute requirement for the production of the wall of the hollow microspheres, since it is possible to use any other thermoplastic material which is essentially insoluble in MMA and has sufficient flexibility.

The hollow microspheres may be coated in order to avoid aggregation, calcium carbonate being particularly suitable in this case. The proportion by weight of this coating may be e.g. 85 wt. %, the specific density of these particles then obviously being significantly higher than that of the uncoated ones.

Because of the special formulation, the shaped components produced using the moulding composition according to the invention generally have a somewhat lower impact strength than other, conventionally produced shaped components. On the other hand, the shaped components of special interest here, such as kitchen sinks, other sanitary-ware components and the like, have a relatively large body thickness, so that this reduction in impact strength is not a problem.

If it is desired to counteract the reduction in impact strength, then a further additive may be added to the moulding composition according to the invention, in order to increase the impact strength again. In particular, elastomer particles or elastomer particle aggregates have been found to be suitable for this, especially those with a so-called core/shell structure. Examples of such additives are described in German published patent specifications DE 40 40 986 and DE 43 02 552 and European published patent specifications EP 0 291 941 and EP 0 776 917. The proportion of such elastomer particles or elastomer particle aggregates, which generally have a particle size <100 $\mu$m (the particle size refers either to the elastomer particles present individually, or to the aggregates if the particles are used in the aggregated state), in which case the amount of such particles, expressed in terms of the mass of the syrup, are used in a range of from 5 wt. % to less than 20 wt. %. Particularly, good results have been obtained with a proportion of elaster particles or elastomer particle aggregates in the 10 to 18 wt. % range.

The elastomer of the particles may consist of partially crosslinked polymer.

In the elastomer particles referred to above, which have a core/shell structure, the core of the particles is formed by the elastomer and the shell from a matrix-compatible polymer which is essentially insoluble in the syrup.

The shell of the elastomer particles is preferably chemically bonded to the core elastomer. The shell preferably comprises a thermoplastic polymer, or alternatively a partially crosslinked polymer.

In preferred particles, the shell can at least partially swell in the syrup of the moulding composition, so that the adjustment of the viscosity of the syrup can take place at least partly through the use of these elastomer particles. Under certain circumstances, it may even be possible to do away with the use of PMMA for moderating the viscosity of the moulding composition here.

Shell polymers which are especially compatible with the syrup are acrylate polymers, which are obviously extremely compatible with the acrylate syrup.

In the event that the core of elastomer particles consists of a partially crosslinked polysiloxane, the latter is preferably grafted with an acrylate monomer to form the shell.

The structure of the core/shell elastomer particles preferably has a proportion by weight of the core in the 40 to 60 wt. % range, expressed in terms of the average total weight of the elastomer particles.

As already mentioned several times, the moulding compositions according to the invention are particularly suitable for the production of sanitary-ware components, a category which is intended to cover kitchen sinks, drainage sinks and the like. Other sanitary-ware components include bathtubs, shower bases, hand washbasins, toilet bowls or work tiles and the like.

The moulding composition according to the invention is suitable, in particular, in cases in which additives for improving impact strength are added in the form of elastomer particles, for the production of kitchen sinks with a relatively small bottom thickness, a category which is intended to cover bottom thicknesses which are smaller than 7 mm.

On account of the very good effects which can be obtained with the addition of elastomer particles as additives, even bottom thicknesses ≦5 mm can be achieved.

Such small bottom thicknesses in the case of kitchen sinks, which can of course be applied analogously to other shaped components, signify not only the use of less polymer material, and hence more economical production, but furthermore also signify shorter cycle times in the production of the shaped components, as well as overall lower weight, which leads to advantages for handling when these shaped components are being processed or installed.

These and further advantages of the invention will be explained in more detail below with reference to examples.

The moulding compositions according to the invention are produced in a manner which is known per se, by dissolving PMMA, if it is used in the formulations, in the monomeric methyl methacrylate (abbreviated to MMA below), and adding the fillers and other additives as well as the polymerization initiator to the syrup.

The temperature cycles for curing the moulding composition in the mould cavities of are no different from the temperature cycles which have been recommended in the prior art. In the subsequent comparative examples and examples, the following temperature cycle was used: before and during filling, the visible side of the mould is regulated to 60° C. and its reverse side to 40° C. The moulding composition is generally at room temperature when filling.

In the mould when it has been filled, the temperature of the visible side is increased to 100° C. and kept at this level for 30 min.

After the mould has been filled, its reverse-side temperature is kept regulated to 40° C. for a further 10 min, and then kept at 100° C. for the rest of the cycle (about 20 min).

The cured shaped components can be released from the mould at 100° C.

In the (comparative) examples, in the cases in which cristobalite powder is employed, corresponding quartz powder may be used without altering the measured mechanical properties.

The deformable, propellant-filled hollow microspheres to be used according to the invention may be introduced into the syrup (solution of PMMA in MMA) or alternately just MMA, or may be added to the ready-mixed conventional moulding composition.

Surprisingly, it has been found that even very small amounts of the hollow microspheres to be used according to the invention are sufficient to achieve complete shrinkage compensation in the moulding compositions.

If, in order to increase the impact strength, elastomer particles or elastomer particle aggregates are used, these are preferably pre-dispersed first in MMA.

The impact strength was measured using the so-called Charpy method, based on DIN 53453. Unlike in the standard, the sample thicknesses result in this case from the thickness of the shaped-component section on which the testing is carried out. All the other conditions in the standard are followed.

The impact loading is in each case applied in such a way that there is an impact perpendicular to the visible side of the shaped component. An instrument model 5102 from the company Zwick in Ulm, Germany is used for the impact experiments.

In the examples described below, the testing of the surface quality is carried out with a roughness test, a roughness depth meter being used for this (model T2000 with linear feed unit LV50 from the company Hommelwerke, Villingen-Schwenningen, Germany). $R_{max}$ is indicated below for the roughness.

COMPARATIVE EXAMPLE 1

1.8 kg of a normal type of PMMA in the molecular weight $M_W$ range of from 50,000 to 200,000 was dissolved in 8.2 kg of MMA, and a mould-release agent (27 g of stearic acid from the company Merck, Germany) and a crosslinking agent (200 g of trimethylolpropane trimethacrylate from the company Degussa, Germany) were added. 17 kg of cristobalite powder (all particles <200 μm, silanized, with the particle size distribution 5%>100 μm, 42 wt. %>32 μm) were then used to adjust the filler content to 63 wt. % of the moulding composition. The volume of the components MMA and PMMA was 10,000 cm³, and the volume of the filler was 7391 cm³. The moulding composition was not compressible at the usually applied pressures of 5 bar max. After the addition of peroxides (35 g of Perkadox 16 and 80 g of Laurox, in each case from the company Akzo, Holland), polymerization was carried out in suitable mould cavities, so as to form a kitchen sink. The filling time was about 45 s and the filling pressure was 3.5 bar.

The impact strength and the surface roughness were determined using a sample taken from the basin bottom (9 mm thick) of the shaped component. A sample was also taken from the side wall (7 mm thick) of the basin. Because of the high roughness of the reverse side of this component, it was not possible to specify a roughness measurement for it.

Results:

Impact strength of both samples: 4.5 kJ/m²

Roughness ($R_{max}$) of the visible side of both samples: 2.21 μm (due to the surface quality of the mould)

Roughness of the reverse-side sample (side wall): not measurable

Roughness of the reverse-side sample (basin bottom): not measurable

COMPARATIVE EXAMPLE 2

2.0 kg of a normal type of PMMA in the molecular weight $M_W$ range of from 50,000 to 250,000 were dissolved in 8.0 kg of MMA, and a mould-release agent (35 g of stearic acid from the company Merck, Germany) and a crosslinking agent (200 g of trimethylolpropane trimethacrylate from the company Degussa, Germany) were added. In this example, the syrup was a comparatively viscous one. 27 kg of a sand with rounded edges in the 200 to 2000 μm particle size range (a mixture of silanized SIG types 1/8 and 2/9 from the company Dorfner in Amberg, Germany) were then added, which gave a filler proportion of 73 wt. % of the moulding composition. The volume of the components PMMA and MMA was 10,000 cm³, the volume of the filler was 10,189 cm³, and the moulding composition was not compressible at the normally applied pressures of 5 bar max. After the addition of peroxides (40 g of Perkadox 16 and 80 g of Laurox, in each case from the company Akzo, Holland), the composition was polymerised in suitable moulds (kitchen sink) in such a way that the visible or used side of the shaped component was turned downwards. The filling time was about 70 s and the filling pressure was 5 bar.

The particle size distribution in terms of area for the filler in the shaped component was very uniform; at the same time the filler underwent slight sinking towards the used side of the shaped component.

The reverse side of the shaped component which was obtained was very rough in parts. After grinding, the reverse side of the drainage area had small holes which impaired the leaktightness of an outlet fixture fitted, however.

The impact strength and the surface roughness were determined using a sample from the basin bottom (11 mm thick) of the shaped component. A sample was also taken from the side wall (9 mm thick) of the basin. Because of the high roughness of the reverse side of this component, it was not possible to specify a roughness measurement for it.

Results:

Impact strength of both samples: 2.0 kJ/m$^2$

Roughness ($R_{max}$) of the visible side of both samples: 98.4 µm

Roughness of the reverse side of the side wall and of the basin bottom not measurable; the shaped component was generally very rough, especially around the drainage area, and holes appeared after mechanical finishing, so that the drain was not leaktight.

EXAMPLE 1

1.8 kg of a normal type of PMMA in the molecular weight $M_W$ range of from 50,000 to 200,000 was dissolved in 8.2 kg of MMA, and a mould-release agent and a crosslinking agent were added as in Comparative Example 1. 17 kg of cristobalite powder (all particles <200 µm, silanized, with the particle size distribution 5%>100 µm, 42 wt. %>32 µm) were then used to adjust the filler content of the moulding composition to 63 wt. %. 0.135 kg of hollow microspheres of the Expancell type (type 091DE80 from the company Akzo Nobel, Sweden) were also added (0.5 wt. %). The volume of the PMMA matrix was 10,000 cm$^3$, the volume of the filler was 7391 cm$^3$, and the volume of the hollow microspheres was 6750 cm$^3$. This corresponded to a proportion by volume of 28% in relation to the moulding composition. The moulding composition was compressible as a filling pressure of 3 bar.

After the addition of peroxides as in Comparative Example 1, polymerisation was carried out in suitable mould cavities, so as to form a kitchen sink. The filling time was about 45 s and the filling pressure was set to 3 bar. It was observed that more composition could be introduced by compression after the tool had been fully filled. The filling pressure (3 bar) was therefore maintained for a few seconds after filling had been completed. A volume compression of about 12% at 3 bar was achieved.

This was found to be sufficient in order to achieve compensation for the shrinkage of the unmodified moulding composition of about 10 vol. %. The impact strength and the roughness of the visible side and the reverse side were determined using a sample from the basin bottom (9 mm thick) and the side wall (7 mm thick) of the shaped component.

Results:

Impact strength of both samples: 2.3 kJ/m$^2$

The impact strength is sufficient for proper use of the shaped component.

Roughness ($R_{max}$) of the visible side of both samples: 0.96 µm

Roughness ($R_{max}$) of the reverse side of both samples: 4.6 µm

Both roughness values correspond to the roughness values of the mould surfaces used, i.e. in the tested areas no detachment of the moulding composition from the tool surfaces due to chemical shrinkage took place during the polymerisation.

EXAMPLE 2

The results of this example are to be compared with Comparative Example 2.

2.0 kg of a normal type of PMMA in the molecular weight $M_W$ range of from 50,000 to 250,000 were dissolved in 8.0 kg of MMA, and a mould-release agent and a crosslinking agent were added as in Comparative Example 2. 27 kg of a sand with rounded edges in the 200 to 2000 µm particle size range (a mixture of silanized SIG types 1/8 and 2/9 from the company Dorfner in Amberg, Germany) were then added, which gave a filler proportion in the moulding composition of 73 wt. %. 0.037 kg of Expancell hollow microspheres (type 091DE80 from the company Akzo Nobel, Sweden) were also added. The volume of the PMMA matrix was 10,000 cm$^3$, the volume of the filler was 10,189 cm$^3$, and the volume of the hollow microspheres was 1850 cm$^3$. The proportion by volume of the hollow microspheres was 8.4%. After the addition of peroxides as in Comparative Example 2, the composition was polymerised in suitable moulds in such a way that the used side of the shaped component was turned downwards. The filling time was about 25 s and the filling pressure was 2 bar. At this pressure, the moulding composition underwent compression by about 4 vol. %, which was sufficient for almost complete compensation for the shrinkage of the especially highly filled basic formulation.

The particle size distribution in terms of area for the filler in the shaped component was very uniform; at the same time the filler underwent slight sinking to the used side of the shaped component. The reverse side of the shaped component (kitchen sink) was quite rough in parts, but after grinding, the drainage area of the reverse side had no holes which could impair the leaktightness of an outlet fixture fitted to it. It was observed that more composition could be introduced by compression after the tool had been fully filled. The filling pressure was therefore maintained for a few seconds after filling had been completed. The impact strength and the roughness of the visible side were determined using a sample from the basin bottom (11 mm thick) and the side wall (7 mm thick) of the shaped component. The reverse side was visually assessed.

Results:

Impact strength of the two samples: 2.8 to 4.2 kJ/m$^2$

Roughness of the visible side of the two samples: 35 to 42 µm

Although the reverse side of the sink is relatively rough, it is substantially smoother and more uniform than in Comparative Example 2. In the outer region, after grinding, there were furthermore no bubbles which could impair the leaktightness of the shaped component when fitted.

EXAMPLE 3

1.5 kg of elastomer particles (type VP 445006 from the company Wacker, Burghausen, Germany) was carefully dispersed 8.5 kg of MMA (aggregates <100 µm), and a mould-release agent and a crosslinking agent were added as in Comparative Example 1. 17 kg of cristobalite powder (all particles <200 µm, silanized, with the particle size distribution 5%>100 µm, 42 wt. %>32 µm) were then used to adjust the filler content to 63 wt. % of the moulding composition. 0.162 kg of hollow microspheres of the Expancell type (type 091DE80 from the company Akzo Nobel, Sweden) were also added (0.6 wt. %). The volume of the modified PMMA matrix was 10,000 cm$^3$, the volume of the filler was 7391 cm$^3$, and the volume of the hollow microspheres was 8100 cm$^3$, which corresponded to a proportion by volume of about 32%. After the addition of peroxides (as in Comparative Example 1), polymerisation was carried out in suitable mould cavities, so as to form a kitchen sink. The filling time was about 11 s and the filling pressure was set to 2 bar. It was observed that more composition could be introduced by compression after the tool had been fully filled. The filling pressure was therefore maintained for a few seconds after filling had been completed. A volume compression of about 10% at 2 bar was achieved. This was sufficient in order to achieve compensation for the shrinkage of the unmodified moulding composition of about 10 vol. %.

The impact strength and the roughness of the visible side and the reverse side were determined using a sample from the basin bottom (5 mm thick) and the side wall (5 mm thick) of the shaped component.

Results:

Impact strength of the two samples: 3.4 to 6.2 kJ/m$^2$

Roughness ($R_{max}$) of the visible side of the two samples: 4.7 to 9.7 µm

Roughness ($R_{max}$) of the reverse side of the two samples: 5.1 to 8.0 µm

The values correspond approximately to the values of the shaping surfaces of the tool.

EXAMPLE 4

7.89 kg of a normal type of PMMA in the molecular weight $M_W$ range of from 50,000 to 250,000 were dissolved in 18.4 kg of MMA, and a mould-release agent (70 g of stearic acid from the company Merck, Germany) and a crosslinking agent (400 g of trimethylolpropane trimethacrylate from the company Degussa, Germany) were added. 0.742 kg of hollow microspheres of the Dualite type (type 6017AE04 from the company Pierce & Stevens Corporation, Buffalo, N.Y., USA) were also added. The volume of the PMMA matrix was 26,258 cm$^3$, and the volume of the hollow microspheres was 5708 cm$^3$. The proportion by volume of the hollow microspheres was about 18%. After the addition of peroxides (80 g of Perkadox 16 and 160 g of Laurox, in each case from the company Akzo, Holland), the composition was polymerised in suitable moulds in such a way that the used side of the shaped component was turned downwards. The filling time was about 100 s and the filling pressure was 4 bar. At this pressure, the moulding composition underwent compression by about 15 vol. %, which was sufficient for almost complete compensation for the shrinkage of the basic formulation without inorganic fillers added.

The impact strength and the roughness of the visible side and of the reverse side were determined using a sample from the basin bottom (9 mm thick) and the side wall (7 mm thick) of the shaped component.

Results:

Impact strength of both samples: 3.6 kJ/m$^2$

Roughness ($R_{max}$) of the visible side of both samples: 1.6 µm

Roughness ($R_{max}$) of the reverse side of both samples 5.3 µm

The measured roughnesses correspond approximately to the roughnesses of the tool surfaces.

COMPARATIVE EXAMPLE 3

1.8 kg of a normal type of PMMA in the molecular weight $M_W$ range of from 50,000 to 200,000 was dissolved in 8.2 kg of MMA, and a mould-release agent and a crosslinking agent were added as in Comparative Example 1. 17 kg of cristobalite powder (all particles <200 µm, silanized, with the particle size distribution 5%>100 µm, 42 wt. %>32 µm) were then used to adjust the filler content of the moulding composition to 63 wt. %. 0.135 kg of non-pre-expanded hollow microspheres of the Expancell type (type 051DU80 from the company Akzo Nobel, Sweden) were also added (0.5 wt. %). The volume of the PMMA matrix was 10,000 cm$^3$, the volume of the filler was 7391 cm$^3$, and the volume of the hollow microspheres was 113 cm$^3$. This corresponded to a proportion by volume of 0.68% in relation to the moulding composition. In the expanded state, these hollow microspheres would have a volume more than 40 times as great, corresponding to a theoretical proportion by volume of more than 20 vol. % in the formulation. The moulding composition was not compressible. After the addition of peroxides, polymerisation was carried out in suitable mould cavities, so as to form a kitchen sink. The filling time was about 45 s and the filling pressure was set to 3 bar. It was observed that no more composition could be introduced by further pressurisation after the tool had been fully filled; even though the filling pressure had been maintained to that end for a few seconds after filling had been completed. No volume compression and no shrinkage compensation were achieved, even though the curing temperatures (cf. above) corresponded to the temperatures for the expansion of the hollow spheres (temperature range 80 to 130° C.).

The impact strength and the roughness of the visible side were determined using a sample from the basin bottom (9 mm thick) and the side wall (7 mm thick) of the shaped component; the roughness of the reverse side was visually assessed.

Results:

Impact strength of both samples: 4.8 kJ/m$^2$

The impact strength is sufficient for proper use of the shaped component.

Roughness ($R_{max}$) of the visible side of both samples: 1.6 µm

This roughness corresponds approximately to the roughness of the shaping surface.

Roughness of the reverse side of both samples: not measurable

The surface of the rear side is extremely rough and cannot be cleaned using a cloth when dirty.

What is claimed is:

1. Moulding composition for the production of sanitaryware components, comprising a methyl-methacrylate-based syrup and up to 85% by weight, expressed in terms of the moulding composition, of an inorganic filler, wherein the moulding composition comprises compressible, propellant-filled hollow microspheres having a plastic wall which is essentially insoluble in methyl methacrylate and which allows said microspheres to remain unbroken in said moulding composition during moulding so as to provide shrinkage compensation, the proportion by volume of the hollow microspheres to the total volume of the moulding composition being in the 5 to 50 vol. % range.

2. Moulding composition according to claim 1, characterised in that the filler content is less than 75 wt. %.

3. Moulding composition according to claim 2, characterised in that the filler content is less than 20 wt. %.

4. Moulding composition according to claim 1, characterised in that the proportion by volume of the hollow microspheres is from 8 to 45 vol. %.

5. Moulding composition according to claim 1, characterised in that the particle size of the hollow microspheres is smaller than 500 μm.

6. Moulding composition according to claim 1, characterised in that the hollow microspheres are pre-expanded hollow microspheres.

7. Moulding composition according to claim 1, characterised in that the syrup comprises PMMA with a molecular weight ($M_w$) of 50,000 to 250,000 in an amount of up to 20 wt. %, expressed in terms of the mass of the syrup.

8. Moulding composition according to claim 1 characterized in that the moulding composition contains elastomer particles or elastomer particle aggregates having a particle size smaller than 100 μm in an amount in the 5 wt. % to <20 wt. % range, expressed in terms of the mass of the syrup.

9. Moulding composition according to claim 8, characterised in that the elastomer of the particles or aggregates consists of partially crosslinked polymer.

10. Moulding composition according to claim 8 characterized in that the elastomer particles have a structure comprising a core and a shell, the core being formed by an elastomer and the shell being formed from a matrix-compatible polymer which is essentially insoluble in the syrup.

11. Moulding composition according to claim 10, characterised in that the shell is chemically bonded to the core elastomer.

12. Moulding composition according to claim 10, characterised in that the shell comprises a thermoplastic polymer.

13. Moulding composition according to claim 10, characterised in that the shell comprises a partially crosslinked polymer.

14. Moulding composition according to claim 10, characterised in that the shell can swell in the syrup of the moulding composition.

15. Moulding composition according to claim 10, characterised in that the shell comprises an acrylate polymer.

16. Moulding composition according to claim 10, characterised in that the core consists of a partially crosslinked polysiloxane, which is grafted with an acrylate monomer to form the shell.

17. Moulding composition according to claim 10, characterised in that the proportion by weight of the core in the core/shell elastomer particles amounts to a proportion of 40 to 60 wt. %.

18. Sanitary-ware component, produced using a moulding composition according to claim 1.

19. Sanitary-ware component in the form of a kitchen sink according to claim 18, the bottom thickness of the kitchen sink being less than 7 mm.

20. Kitchen sink according to claim 19, characterised in that the bottom thickness is ≦5 mm.

21. Moulding composition according to claim 8 characterized in that the elastomer particles or elastomer particle aggregates are present in an amount of 10 to 18 wt. %, expressed in terms of the mass of the syrup.

* * * * *

UNITED STATES PATENT AND TRADEMARK OFFICE
CERTIFICATE OF CORRECTION

PATENT NO.     : 6,664,314 B1
DATED          : December 16, 2002
INVENTOR(S)    : Andreas Hajek et al.

It is certified that error appears in the above-identified patent and that said Letters Patent is hereby corrected as shown below:

<u>Title page,</u>
Item [73], Assignee, replace with -- BLANCO GmbH + Co KG, Oberderdingen, Germany --.

<u>Column 12,</u>
Line 27, replace "$\leqq$" with -- $\leq$ --.

Signed and Sealed this

Fourteenth Day of September, 2004

*JON W. DUDAS*
*Director of the United States Patent and Trademark Office*